(12) United States Patent
Simske et al.

(10) Patent No.: US 8,891,136 B2
(45) Date of Patent: Nov. 18, 2014

(54) METHOD AND SYSTEM FOR GENERATING A DOCUMENT HAVING A LAYERED VOID PANTOGRAPH

(75) Inventors: Steven J. Simske, Fort Collins, CO (US); Jason S. Aronoff, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 8 days.

(21) Appl. No.: 13/810,687

(22) PCT Filed: Oct. 21, 2010

(86) PCT No.: PCT/US2010/053524
§ 371 (c)(1),
(2), (4) Date: Jan. 17, 2013

(87) PCT Pub. No.: WO2012/054036
PCT Pub. Date: Apr. 26, 2012

(65) Prior Publication Data
US 2013/0114113 A1 May 9, 2013

(51) Int. Cl.
*H04N 1/40* (2006.01)
*H04N 1/00* (2006.01)
*B41M 3/14* (2006.01)
*H04N 1/32* (2006.01)
*G06K 15/02* (2006.01)

(52) U.S. Cl.
CPC ........ *G06K 15/02* (2013.01); *H04N 2201/0006* (2013.01); *H04N 1/00045* (2013.01); *B41M 3/14* (2013.01); *H04N 1/32251* (2013.01); *H04N 1/00068* (2013.01); *H04N 1/0087* (2013.01); *H04N 1/00883* (2013.01); *H04N 1/00092* (2013.01); *H04N 1/00005* (2013.01); *H04N 1/00015* (2013.01); *H04N 1/32229* (2013.01); *H04N 1/00031* (2013.01); *H04N 1/0009* (2013.01)
USPC ......... 358/3.28; 358/3.06; 358/450; 358/540; 382/100

(58) Field of Classification Search
None
See application file for complete search history.

(56) References Cited

U.S. PATENT DOCUMENTS

| 5,788,285 | A | 8/1998 | Wicker |
| 7,457,957 | B2 | 11/2008 | Choi et al. |

(Continued)

FOREIGN PATENT DOCUMENTS

| EP | 1780636 | 5/2007 |
| JP | 2009061719 A | 3/2009 |

OTHER PUBLICATIONS

"The Hollow Pantograph—What Does It Mean to You?", Standard Register Healthcare, 2013, accessed online Jan. 16, 2013 <http://www.standardregister.com/securescrip/hollow-pantograph.asp>, 1 p.

*Primary Examiner* — Dung Tran (57) ABSTRACT

A method and system for generating a document having a void pantograph highlight pattern is presented. The method includes computing a score for a void pantograph highlight pattern layer in relation to a document formatted content layer, incrementing a relative position of the void pantograph highlight pattern layer and the document formatted content layer, repeating the computing and the incrementing steps to obtain a plurality of scores at a plurality of relative positions, evaluating the plurality of scores to determine an optimal alignment, and printing the document using variable-data printing techniques, wherein the printed document has a multi-layer architecture including the document formatted content layer and the void pantograph highlight pattern layer. The system includes a control processor, a score computation unit and an evaluation unit. The control processor provides a printer with data containing a multi-layer architecture document having a document formatted content and a void pantograph highlight pattern.

13 Claims, 9 Drawing Sheets

(56) References Cited

U.S. PATENT DOCUMENTS

| | | | |
|---|---|---|---|
| 7,609,847 B2 * | 10/2009 | Widdowson et al. | 382/100 |
| 8,065,627 B2 * | 11/2011 | Atkins | 715/788 |
| 8,090,141 B2 * | 1/2012 | Eschbach et al. | 382/100 |
| 8,161,377 B2 * | 4/2012 | Atkins | 715/243 |
| 8,355,180 B2 * | 1/2013 | Wu et al. | 358/3.28 |
| 8,593,698 B2 * | 11/2013 | Simske et al. | 358/3.28 |
| 2006/0109510 A1 * | 5/2006 | Widdowson et al. | 358/1.18 |
| 2010/0150433 A1 | 6/2010 | Wang et al. | |
| 2010/0259792 A1 | 10/2010 | Cole et al. | |
| 2013/0101230 A1 * | 4/2013 | Holeva et al. | 382/202 |
| 2013/0251191 A1 * | 9/2013 | Simske et al. | 382/100 |

* cited by examiner

VOID VOID VOID VOID
VOID VOID VOID VOID
VOID VOID VOID VOID
VOID VOID VOID VOID
VOID VOID VOID VOID
VOID VOID VOID VOID

Embed VOID Pattern (B)

```
for (x = xstart; x < xstart + xspan; x += x_increment)
{
    for (y = ystart; y < ystart + yspan; y += y_increment)
    {
        score = ScoreOverlap (Document Formatted Content, Void
                              Pantograph);
        if (score > max_score)
        {
            max_score = score;
            max_score_xindex = x;
            max_score_yindex = y;
        }
    }
}
```

METHOD AND SYSTEM FOR GENERATING A DOCUMENT HAVING A LAYERED VOID PANTOGRAPH

BACKGROUND

A void pantograph may be a special pantograph screen printed in the background of a document. A void pantograph may help to make the document hard to duplicate, forge, and/or alter. The void pantograph may have the word "VOID" or "COPY" as a hidden element by the use of special screens and/or background designs. When reproduced, the hidden element appears on the copied document.

Some prominent examples of void pantographs are those that are used as backgrounds for checks, which, for example, display "VOID" or "COPY" on the reproduced image. Void pantographs may be used for packaging, labels, documents, or the like. In general, pantograph approaches may be used to hide in plain sight a variety of other information that can be read and acted upon.

DETAILED DESCRIPTION

A document in accordance with an embodiment of the invention may include a modular, multi-layer architecture definition of a void pantograph that includes a void pantograph background pattern and a void pantograph highlight pattern. The graphical alignment of the overt document foreground content with the prior-to-photo-imaging covert void pantograph background content may be optimized for the combination of document and void pantograph content in accordance with an embodiment of the invention.

Figure 1:
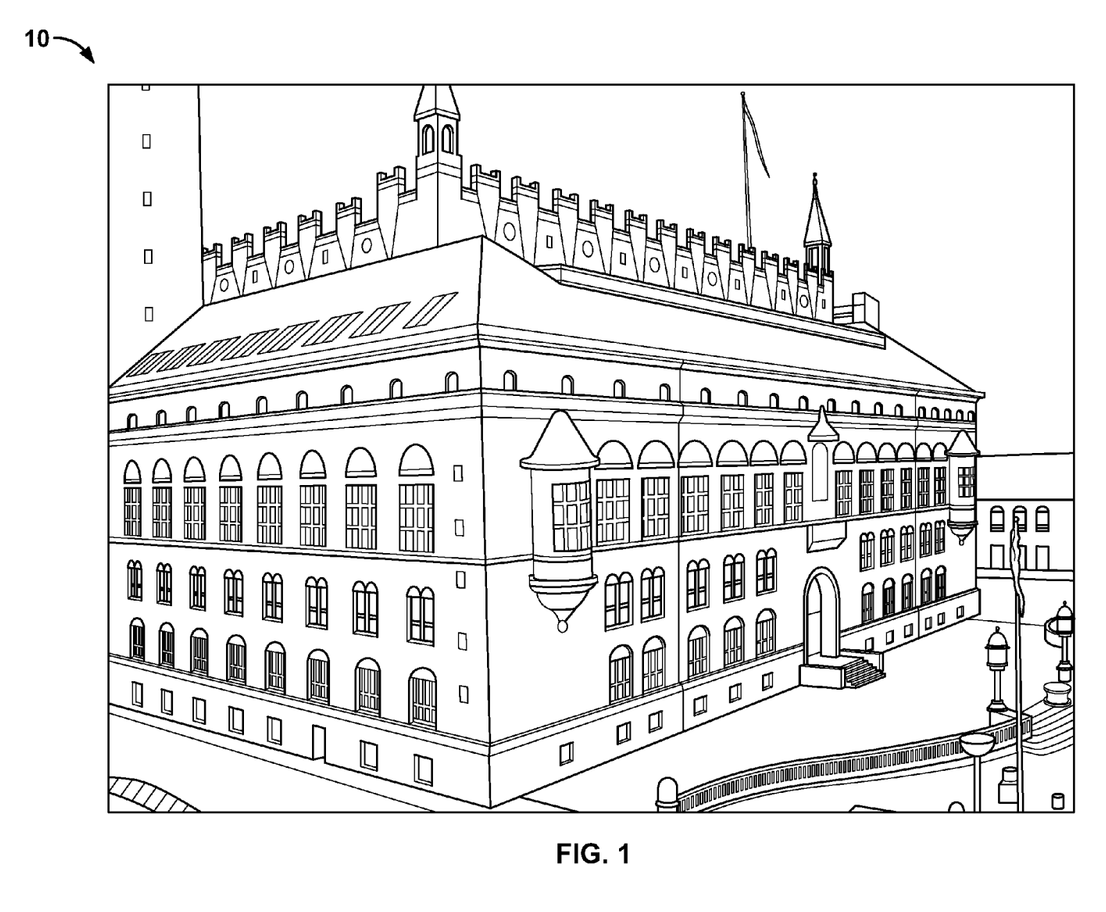
FIG. 1 is a schematic representation of an image.

FIG. 1 schematically represents a non-limiting example of image 10 from which a void pantograph may be generated. Image 10 may be any digitized image, including an image captured with a digital camera, camcorder, or scanner. The image may also be produced by imaging software, graphics software, or the like. The image may be any desirable image—e.g., text, shapes, glyphs, embedded information to initiate, instantiate, continue, complete, etc. workflow(s), security applications, or other information that can be read and interpreted. The image may be custom designed using a company's name or logo.

Image 10 may be filtered using one or more filters. Non-limiting examples of such filters include an edge filter (e.g., Sobel operator, Canny operator, Laplace operator, neighborhood variance, gradient, etc.), a color filter, a hue filter, a chroma filter, a saturation filter, a brightness filter, an intensity filter, a luminance filter, a texture filter, a local entropy filter, a graininess filter, a specific shape filter, a threshold filter (Otsu adaptive method, etc.), a sharpness filter, a convolution filter, and/or other imaging filters. One or multiple filters may be selected to filter image 10.

Figure 2:
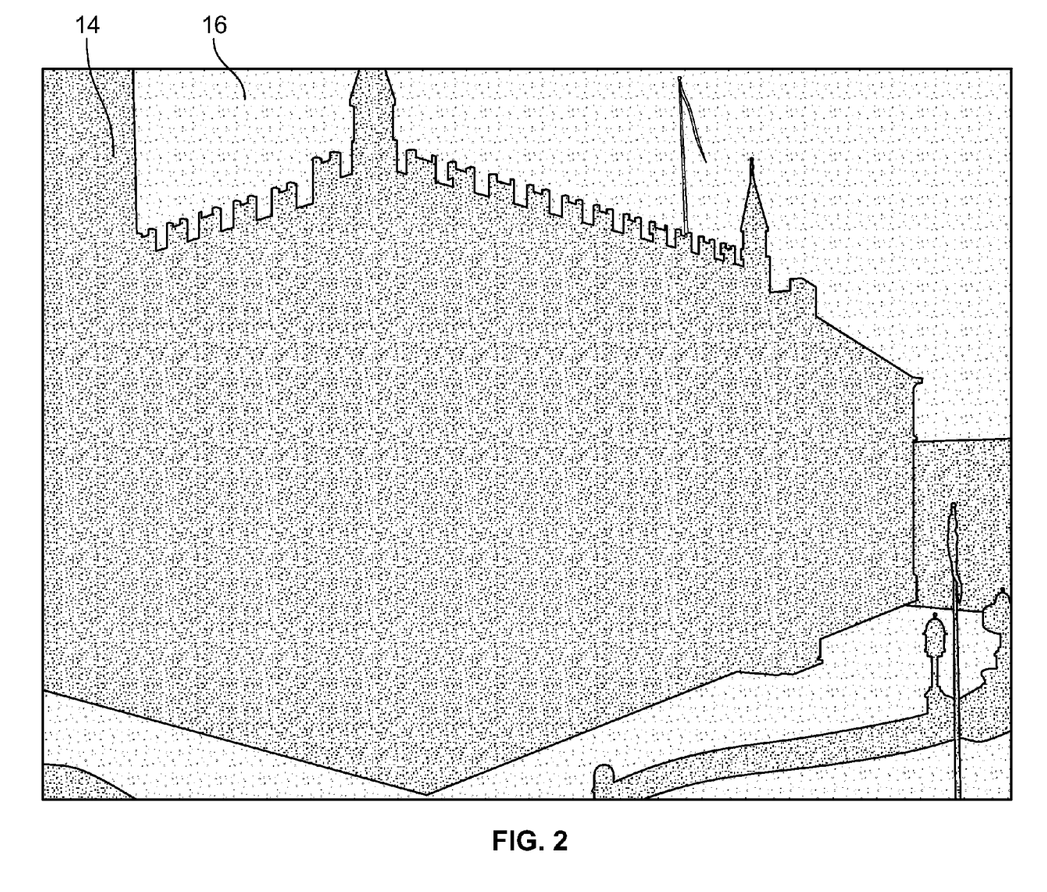
FIG. 2 depicts a photocopy of a void pantograph formed from the image of FIG. 1.

FIG. 2 depicts a photocopy of void pantograph 12 (a void pantograph may be virtually invisible after printing). The filter(s) may designate one or more areas for a pantograph background pattern 14 and a pantograph highlight pattern 16 based upon the particular attribute associated with the filter. For example, if an edge filter is selected to filter image 10, the filtering process may identify edge pixels and non-edge pixels. The filtered pixels may then be assigned to the pantograph's background pattern 14 or highlight pattern 16, depending, at least in part, on which pixels are suitable for forming the respective regions of the void pantograph. In the example involving an edge filter, the edge pixels may be assigned to the pantograph background pattern 14, and the non-edge pixels may be assigned to the pantograph highlight pattern 16.

As used herein, the phrase "pantograph background pattern" refers to the portion of the void pantograph that may be covert or semi-covert after being printed on an object, but that becomes patent or overt after the printed region of the object is scanned and/or photocopied. In other words, the pantograph background pattern 14 may be visible to the human eye (perhaps upon close inspection) after printing and may be virtually indistinguishable from both the pantograph highlight pattern 16 and the object foreground (not shown) after printing. Also as used herein, the phrase "pantograph highlight pattern" refers to the portion of the void pantograph that may be covert or semi-covert after being printed on an object). When printed, a void pantograph highlight pattern and a void pantograph background pattern may (and properly should) look the same, and so their relative coverage of the printed area may be obfuscated. After printing, the highlight pattern and the background pattern may (and properly should) differentially stand out from one another.

Once the areas of image 10 are identified as being suitable for the pantograph background pattern 14 or pantograph highlight pattern 16, the characteristics of background pattern 14 and/or highlight pattern 16 may be systematically manipulated, altered, etc. in order to generate a test sheet. Examples of such characteristics include pixel size, shape, orientation, color, distribution, spacing pattern, "coverage" or mean grayscale intensity, or combinations thereof, etc.

Figure 3A:
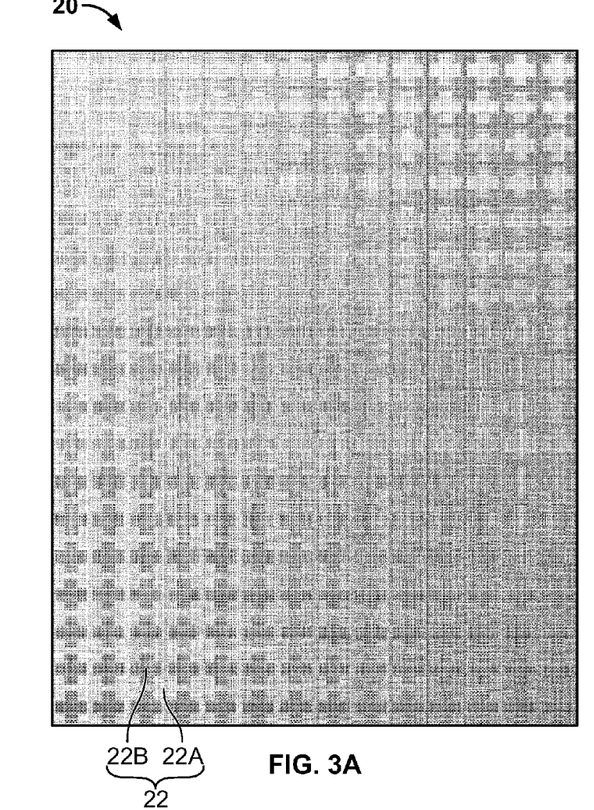
FIGS. 3A-B depict a computer-generated test sheet having multiple test pantographs in accordance with an embodiment of the invention.
Figure 3B:
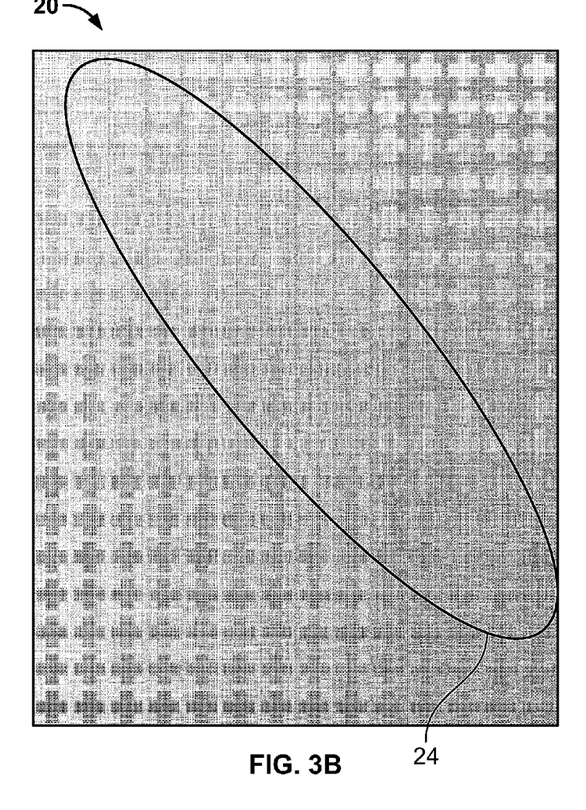

FIGS. 3A-3B depict computer-generated, printed test sheet 20 having multiple test pantographs in accordance with an embodiment of the invention. As mentioned above, the pantograph image may be any desirable image. Test sheet 20 may include variations in test pantograph 22, which itself may include, for example, a square background pattern 22A and a cross highlight pattern 22B. Many other shapes and/or combination of shapes combinations may also be used. The square background pattern may be printed from many individual pixels forming collectively one shape (e.g., a dot, square, oval, etc.) and the cross highlight pattern may be printed from many individual pixels forming collectively another shape. The shape of the individual pixels used to form background pattern 22A and highlight pattern 22B may or may not be the same shape. In some implementations, the background and highlight patterns may be the same shape if an aggregate of shapes are used together as a void pantograph itself, or if a non-uniform press (i.e., a printing press having different characteristics in x and y directions) is used.

Test pantograph 22 is repeated along rows and columns of test sheet 20. Each test pantograph 22 may be different from the next test pantograph by a variation in the individual pixel density of either foreground 22A and/or background 22B. This variation in pixel density may be accomplished by incrementing the percentage of "coverage" (e.g., density—percentage of black pixels printed) over the test page, and may be expressed as a percentage of the amount of pixel fill over the total amount of area for the respective background pattern or highlight pattern shape. Rows of test sheet 20 may have an increase in the pixel density for the background pattern 22A, and columns of test sheet 20 may have an increase in the pixel density for the highlight pattern 22B. In one implementation, the incremented variable may be reversed between row and column.

In generating test sheet 20, any desirable characteristic may be selected to remain static while other characteristics are varied. For example, various background patterns may be tested against various highlight patterns; a desirable background pattern setting may be selected and then set, then the highlight pattern characteristics may be altered to generate the test sheet. The test pantographs are used to experiment with different characteristics in order to determine the best characteristics for deployment of the void pantograph.

From the set of suitable background/highlight pattern candidates, final deployment settings may be determined by using the combination(s) that provide the best visible results after copying. The best settings may be those where test pantograph 22 is least visible after printing but most visible after photo-imaging (e.g., scanning or photocopying). In particular, those test pantographs with background patterns 22A that are not visible and/or distinguishable after printing or photo-imaging may have the best settings.

FIG. 3B depicts printed test sheet 20 with the set of potential candidate void pantograph settings. These potential candidate void pantograph settings are outlined within area 24. Area 24 may appear anywhere on test sheet 20 based on how the characteristics of test pantograph 22 is varied. Area 24 may also be non-contiguous based on the test pantograph characteristic variation. Within area 24 test pantograph 22 may be least visible, while inspection of the variations of test pantograph 22 outside ellipse 24 may reveal that one, or both, of background pattern 22A and highlight pattern 22b may be more pronounced than the variations within area 24. The ideal test pantograph is one where the background pattern and highlight pattern blend together resulting in a test pantograph that may be visually indistinguishable when printed, but highly distinguishable when photocopied.

Once the settings for the void pantograph are obtained, a multi-layer approach to producing a printed item having the void pantograph may be implemented.

Figure 4:
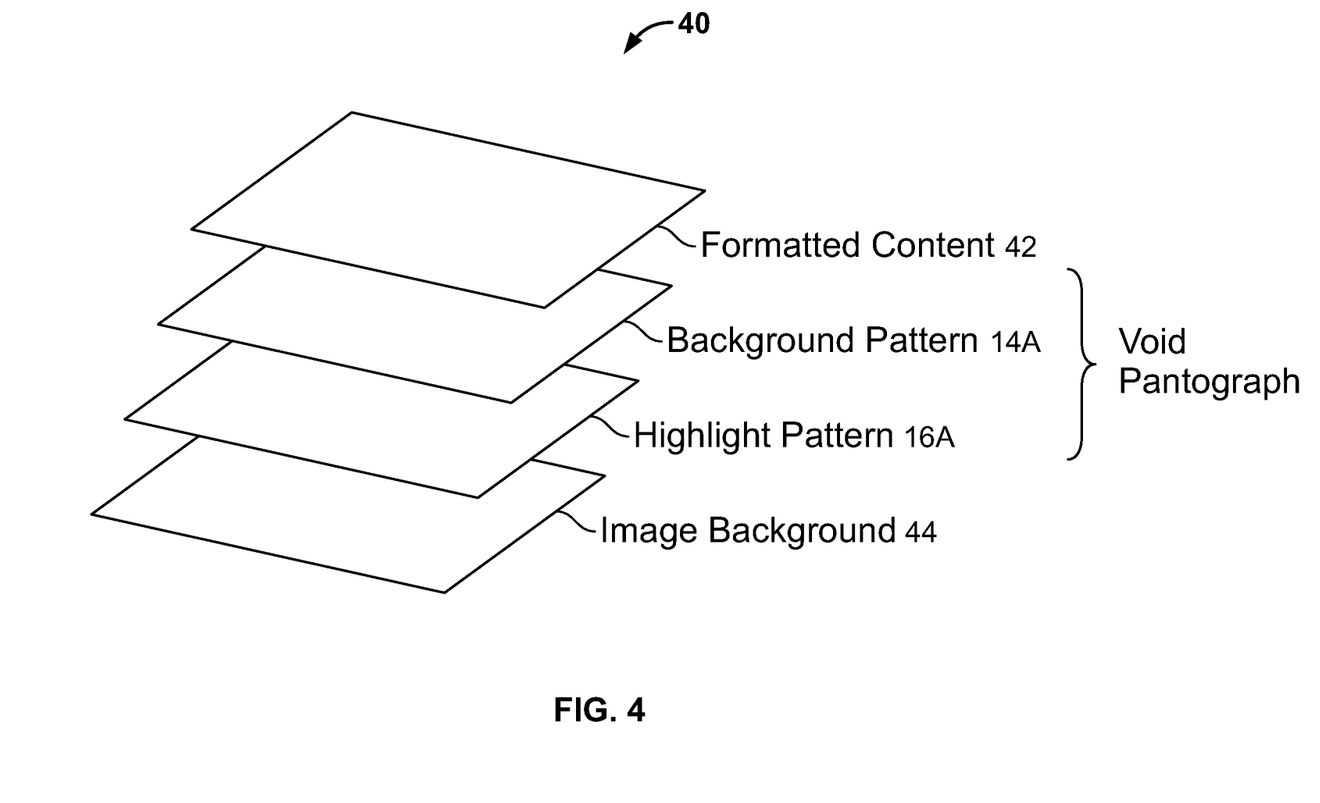
FIG. 4 depicts a document having a multi-layer void pantograph architecture in accordance with an embodiment of the invention.

FIG. 4 depicts document 40 that may be printed with a layered void pantograph architecture in accordance with an embodiment of the invention. The void pantograph architecture may include a four-layer approach in accordance with an embodiment of the invention. Document 40 having a layered void pantograph architecture may include document formatted content 42, void pantograph background pattern 14A, void pantograph highlight pattern 16A, and image background 44. The image background may be a uniform color. Document formatted content 42 may include information (e.g., branding, aesthetics, product information, etc.).

Document formatted content 42 is above void pantograph background pattern 14A, which is above void pantograph highlight pattern 16A, which is above image background 44 thus creating a flattened image that has precedence, e.g., order, among its layers. This precedence may imply that document formatted content 42, void pantograph background pattern 14A, and void pantograph highlight pattern 16A may be logical masks tied to content—e.g., the content of each successively higher layer overwrites or masks the layer(s) beneath that content.

In one implementation, document formatted content 42 may include one-use information, for example promotional offer codes, special coupons, serialized information, etc. The void pantograph may prevent the copying of the document, thus eliminating unauthorized and/or excessive use. Such a document containing one-use information may be printed using variable-data printing (VDP) techniques. VDP may have elements of a document change from one printed piece to the next. By using information from a database or file, the VDP process need not slow down nor stop. VDP may allow for full variability printing, where the text and images can be altered for each individual piece using a basic design as a building block. The basic design of the document may indicate the sections that may be altered. In some implementations, two different coupons having the same SKU, manufacturer, item type, etc., may need different alignment of the layers to make the void pantograph background pattern more readable.

Spatial alignment (e.g., orientation) of document foreground 42 and void pantograph background 16A may allow document 40 to print clearly, but if copied document foreground 42 may be obstructed by the appearance of void pantograph background 16A. The spatial alignment of the document foreground and the void pantograph background may be translated in one or more degrees of freedom (i.e., along the plane of the document in the x-axis, the y-axis, and about an angle in the plane of the document).

FIG. 5A depicts a field of text (e.g., "VOID") that may be used as void pantograph highlight pattern 16A. As mentioned above, the void pantograph highlight pattern may be any desirable image. FIG. 5B depicts a void pantograph incorporating the field of text depicted in FIG. 5A with a void pantograph background pattern 14A. In this example, void pantograph background pattern 14A includes a random background. FIG. 5B may represent the appearance of document 40 in those regions where document formatted content 42 has not overwritten document image background 44. In some implementations, a void pantograph background pattern may use a lattice in presenting its content so that the void pantograph highlight pattern 16A may be moderately visible in these regions. Void pantograph background pattern 14A may act as a concealing background to provide a uniform pre-copy appearance for document 40. The concealing effect may be greatly reduced, or even disappear, on photocopies of document 40.

Figure 6:
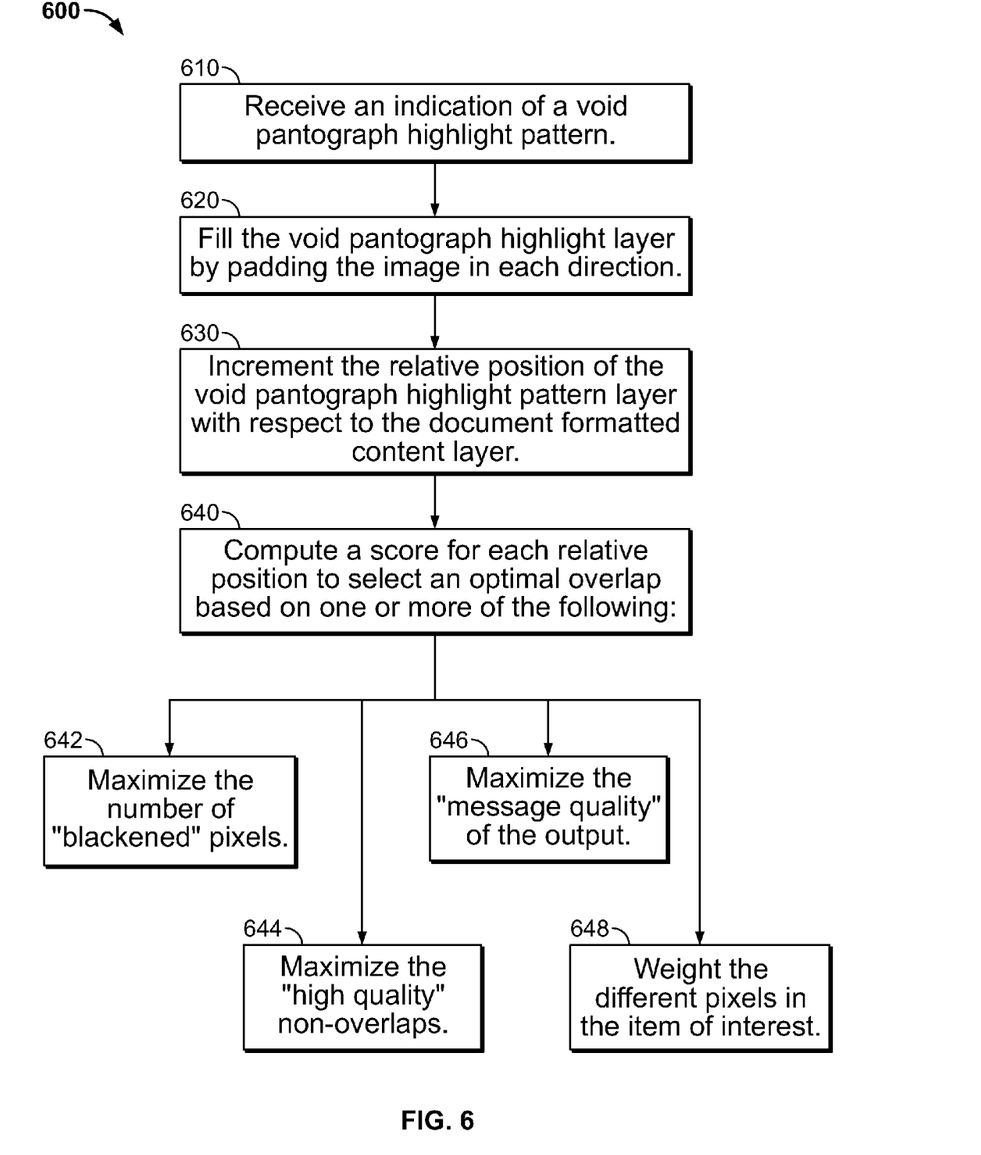
FIG. 6 depicts a process in accordance with an embodiment of the invention.

FIG. 6 depicts process 600 in accordance with an embodiment of the invention. Process 600 combines the selected test pantograph with the document formatted content and the document image background to create document 40 having the layered void pantograph architecture discussed above, in accordance with an embodiment of the invention.

A system for implementing process 600 in accordance with an embodiment of the invention may receive an indication of a void pantograph image, step 610. The void pantograph image may include void pantograph highlight pattern 16A and void pantograph background pattern 14A. The void pantograph image may be selected from a group of test pantographs as discussed above regarding FIGS. 3A-3B.

The void pantograph image may be padded, step 620, in the x and/or y directions so as to fill the width and height of the document space.

The spatial alignment of the void pantograph image in relative position to document formatted content 42 may be incremented, step 630. The spatial alignment may be incremented along one or more of the document's x-axis and y-axis.

Figure 7:
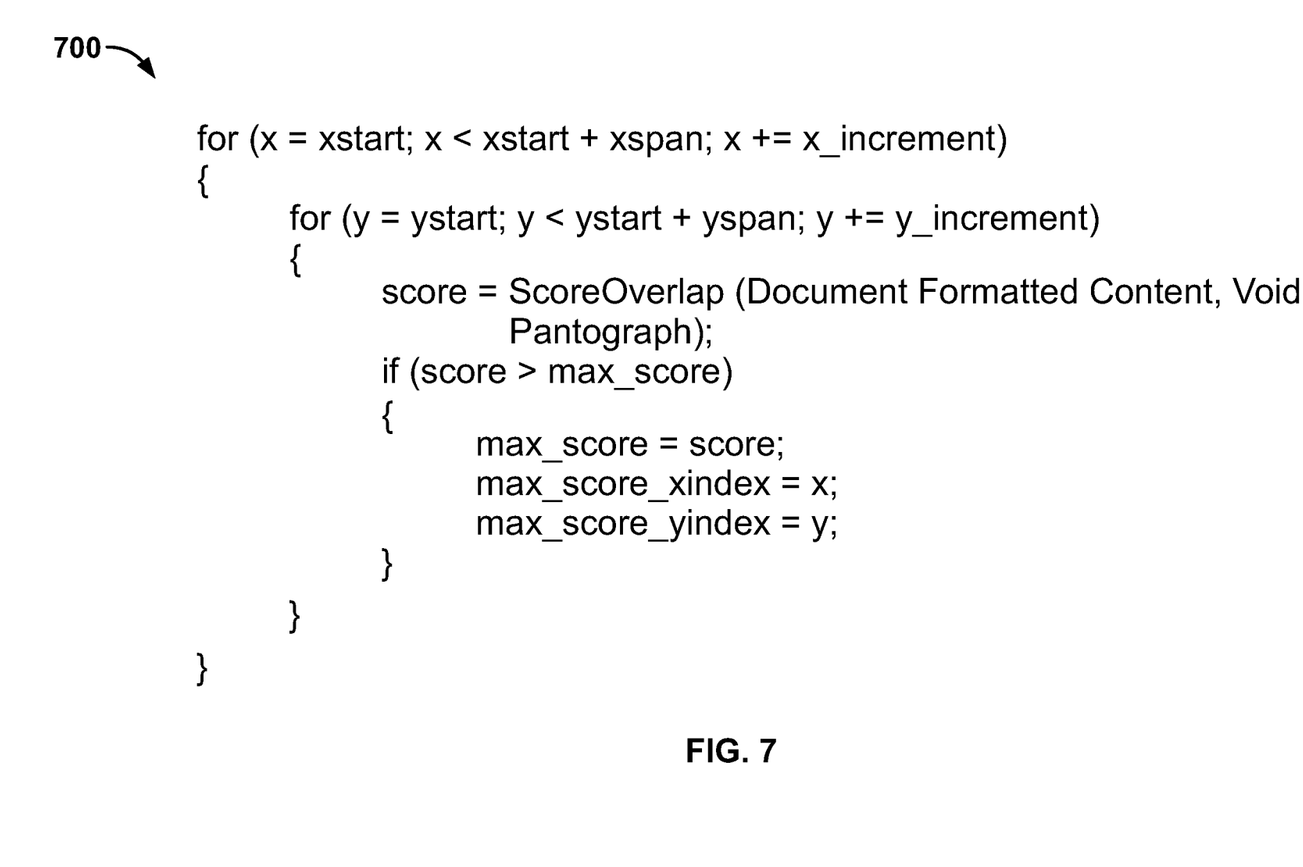
FIG. 7 depicts pseudo-code for optimizing layer placement in accordance with an embodiment of the invention.

FIG. 7 depicts pseudo-code 700 that may be used for optimizing layer placement in accordance with an embodiment of the invention. As depicted in FIG. 7, for each relative position from the starting x position (xstart) and the starting y position (ystart), the relative position may be respectively incremented by x_increment and y_increment for the span (xspan, yspan) of the document.

A score may be computed, step 640, for each relative position of the void pantograph image and document formatted content 42. The computed score may be used to evaluate an optimal overlap spatial alignment for the void pantograph and the document formatted content.

With reference to FIG. 7, if the current score is greater than the maximum score (maxscore) then the current score may replace maxscore, and the current x and y relative positions may be saved as the max_score indices (max_score_xindex and max_score_yindex, respectively).

Calculating and evaluating the score can be performed in a number of ways; four exemplary approaches in accordance with an embodiment of the invention are described here, and may be used separately or together.

(1) The number of "blackened" pixels in the void pantograph highlight pattern may be maximized, step 642. A "blackened" pixel is defined to mean a pixel where the void pantograph highlight pattern is not overwritten by the document formatted content.

Figure 5:
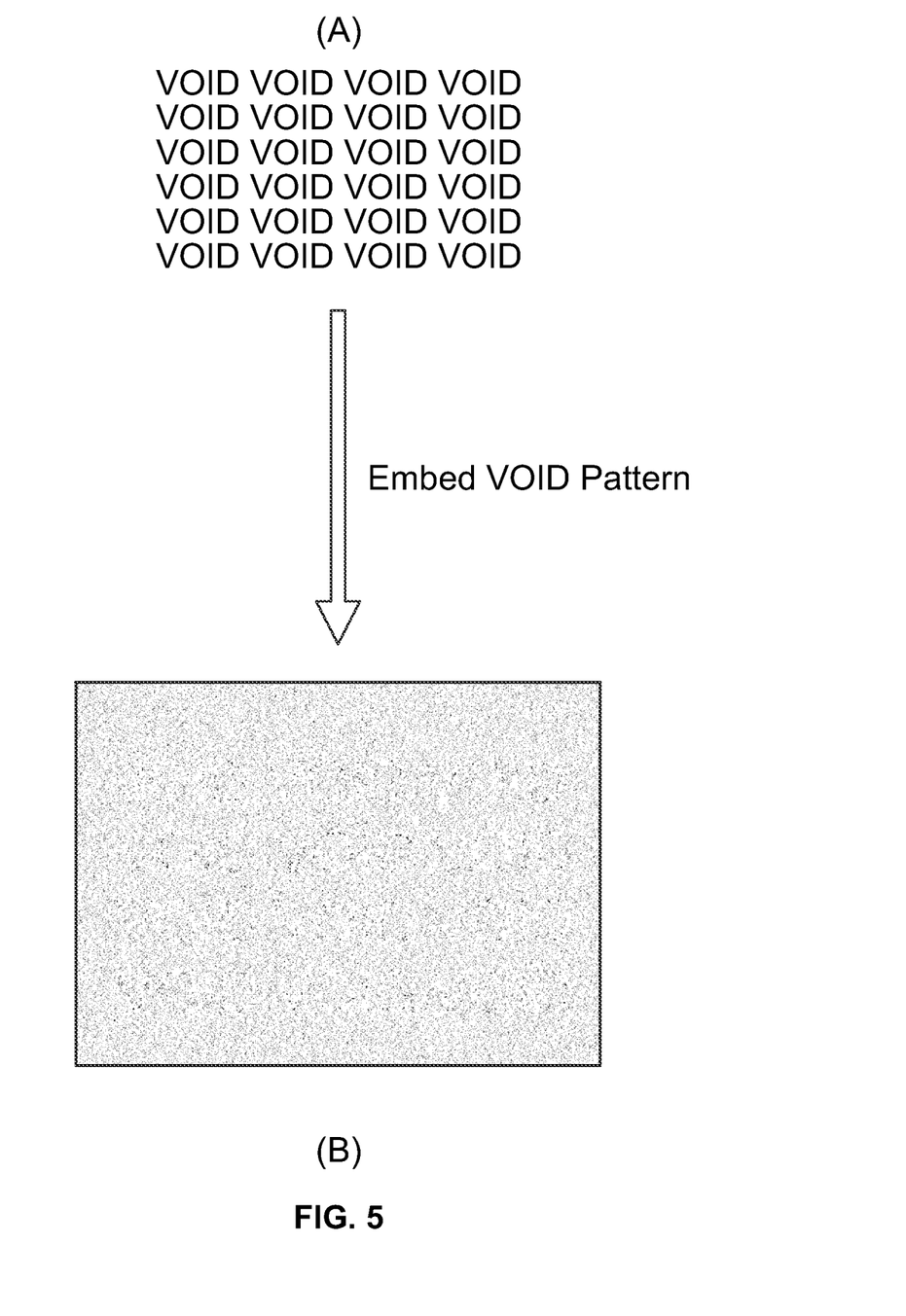
FIGS. 5A-B depict a field of "VOIDs" incorporated into a void pantograph in accordance with an embodiment of the invention.

(2) The number of "high quality" non-overlaps may be maximized, step 644. A "high quality" non-overlap is defined to mean an area where information in the void pantograph highlight pattern would be conveyed when visible after the document is photocopied. For example, a high quality non-overlap may be one where the text of a logo is visible as opposed to just a portion of the logo's graphic or color; or with reference to FIG. 5, the number of "VOID" items that are overlapped by no more than some threshold by the document formatted content layer (e.g., the void pantograph highlight pattern is not overlapped by more than some predetermined threshold percentage). The amount of non-overlap can be calculated by determining the non-overlapped area and/or blackened pixels for the item of interest (i.e., the void pantograph highlight pattern).

(3) The "message quality" of the output may be maximized, step 646. The message quality may be assessed automatically by using OCR techniques to determine whether there is successful optical character recognition of the items of interest. Manual assessment of message quality may be obtained by testing users to determine at which relative position users can most readily identify the content of the void pantograph (e.g., "VOID") after photo-imaging the document.

Figure 8A:
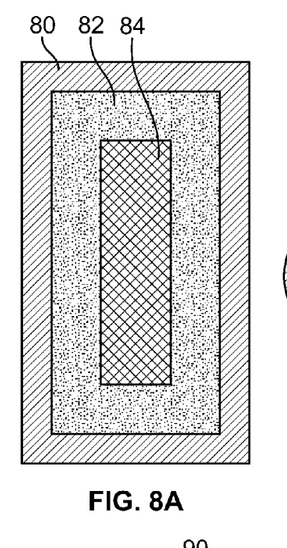
FIGS. 8A and 8B depict sample weightings of two different elements of an item of interest in accordance with an embodiment of the invention.
Figure 8B:
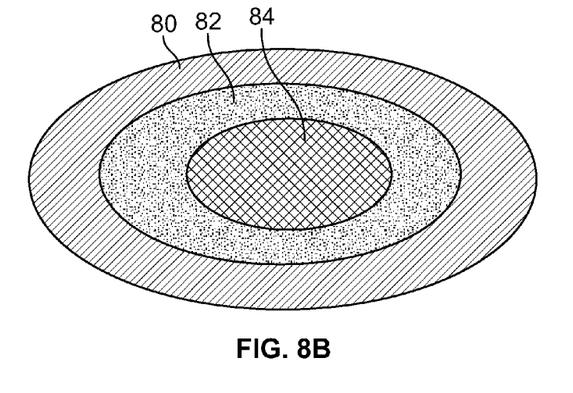
Figure 9:
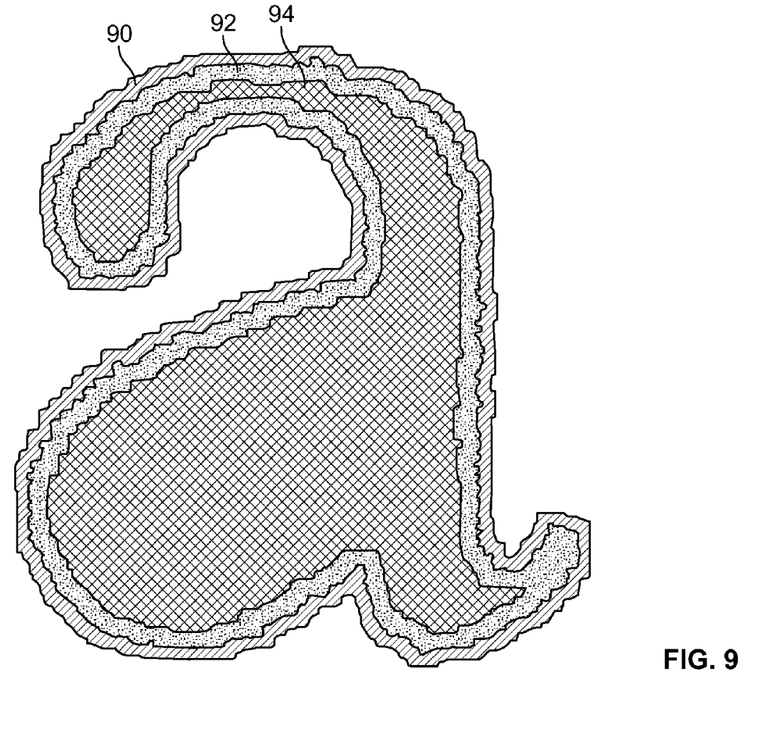
FIG. 9 depicts sample weighting of two different elements of an item of interest in accordance with an embodiment of the invention.

(4) The different pixels in the item of interest may be assigned a weight, step 648. The relative position that maximizes the overall weight may receive the highest score. FIGS. 8A-8B and 9 depict different weighting technique results in accordance with embodiments of the present invention.

FIGS. 8A and 8B depict sample weightings of two different overlap (x, y) elements (i.e., individual void pantograph images padded across the document space) of an item of interest in accordance with an embodiment of the invention. A logo used as a void pantograph image may be a combination of text, a graphic, and a color. Each of the logo's text, graphic, and color may be an example of different elements of the item of interest. Each pixel of the item of interest may contribute incrementally to an overall optimized alignment.

After weighting the different pixels of the item of interest (step 648), the weightings may be portrayed pictorially as shown in FIG. 8A. After incrementing the overlap and again weighting the different pixels of the item of interest, the weighting may be portrayed pictorially as shown in FIG. 8B. Outer region 80 may have a low weighting (e.g., weight=1) and may represent the relative weight assigned to the color of the item of interest. Middle region 82 may have a medium weighting (e.g., weight=3). Central region 84 may have a high weighting (e.g., weight=10) and may represent the relative weight assigned to the text of the item of interest. Central region 84 may represent the relative weight assigned to that portion of the item of interest necessary for a person to recognize (e.g., read) the item of interest. The pictorial portrayals of FIGS. 8A and 8B allow for interpretation of the relative weighting of the two different overlap positions. Those portions of the element that may be more crucial to recognizing the shape, or text, may be more heavily weighted than other portions of the element. For example, if the element is an arrow (→) the arrowhead may have a greater weight than the shaft, since the arrowhead may be more crucial to recognizing that the shape is an arrow.

FIG. 9 depicts sample weighting for one overlap (x, y) position of an element of an item of interest in accordance with an embodiment of the invention. In particular, FIG. 9 depicts the sample weighting for the character "a" of an item of interest. Outer region 90 may have a low weighting (e.g., weight=1). Middle region 92 may have a medium weighting (e.g., weight=3). Central region 94 may have a high weighting (e.g., weight=10). Each region's weighting may be assigned based on the relative value of interpreting the character—e.g., the added value of the region needed to convey the character. For example, at the overlap position being weighted the character "a" may be recognized based on just central region 94. The inner region of the "a" character in FIG. 9, for example, can be considered a skeleton of the character, and may be discernible as an "a". Therefore, the two surrounding regions may be weighted lower since they may not be as crucial to recognizing that the character is an "a."

In one implementation, an image processor and/or an optical character recognition system (OCR) may be used to compare digital images of a printed document after photo-imaging to compute the overall weight for different overlap positions. The overlap position with the greatest weight may be the optimal registration alignment for the combination of the void pantograph background and the document foreground.

An embodiment of the invention may provide a modular definition of a void pantograph having four independent layers. This modular definition may provide a means to optimize the appearance of a void pantograph after photo-imaging the document. The modular definition of the void pantograph in accordance with an embodiment of the invention may permit fully variable printing, where each void pantograph can be unique. Each void pantograph can be unique inasmuch as it may have different x, y alignment, and/or angular alignment, and/or spacing between repeated elements—e.g., between two "VOID"s, etc. In some implementations, the message itself could even be varied, e.g., using "FAKE" instead of "VOID."

Optimizing the void pantograph appearance in accordance with an embodiment of the invention may tightly connect the layers while maintaining their modular definition and access. Optimization may be accomplished by incorporating metrics that score different overlap positions and/or alignments, which can be evaluated by a user, an image processor, and/or an OCR system. An optimized void pantograph appearance may achieve nearly invisible appearance after printing with high message visibility after photo-imaging the document.

Figure 10:
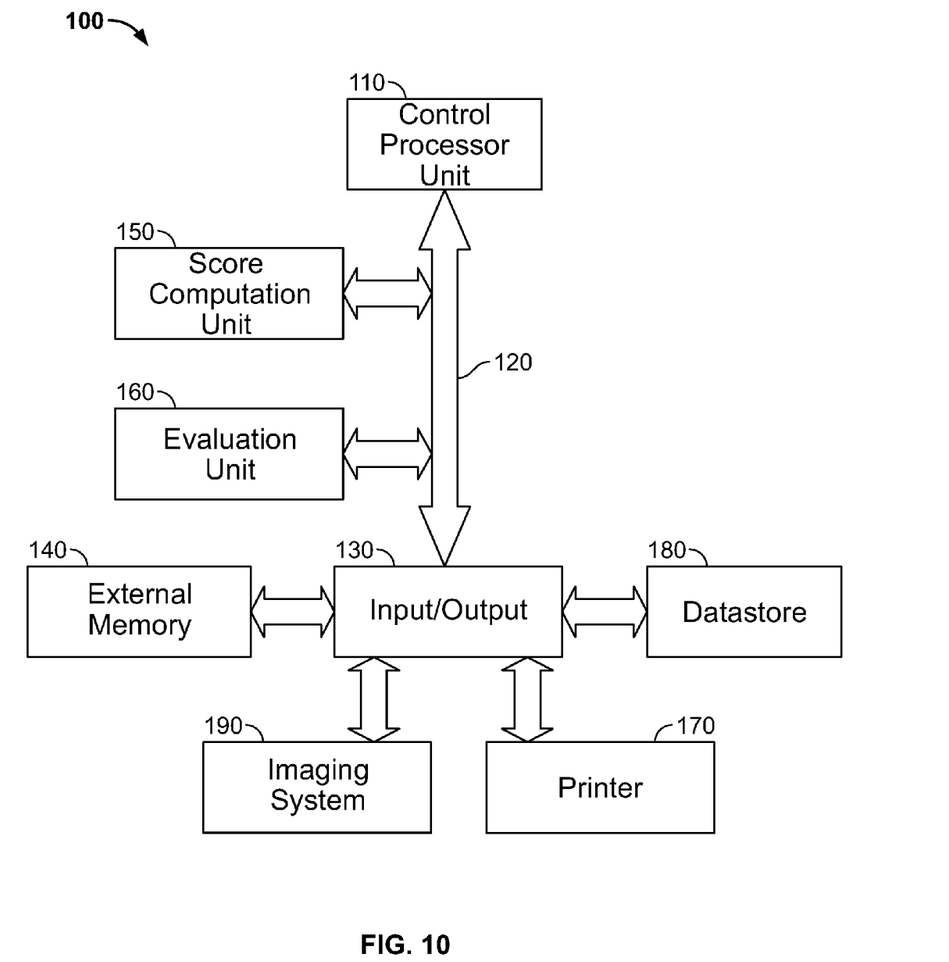
FIG. 10 depicts a schematic of a system in accordance with an embodiment of the invention.

FIG. 10 depicts a schematic of components of system 100 in accordance with an embodiment of the invention. System 100 may include control processor 110 that may be connected to an internal bus 120. The controller may be a processing unit, a field programmable gate array, discrete analog or digital circuitry, etc. Control processor 110 may access a computer application program stored in non-volatile memory internal to control processor 110 (not shown) or stored in external memory 140. External memory 140 may be connected to control processor 110 via input/output (I/O) port 130. The computer application program may cause control processor 110 to perform one or more of the above-described methods when executed.

System 100 may include score computation unit 150 that may compute a score for a void pantograph highlight pattern in relation to a document formatted content layer. Score computation unit 150 may compute a score for one or more relative positions of the void pantograph highlight pattern and the document formatted content. The score computation unit may be implemented by dedicated hardware, software modules, and/or firmware, where control processor 110 executes the instructions. Other units discussed herein may also be implemented by dedicated hardware units, software modules, and/or firmware, where control processor 110 executes the instructions.

Evaluation unit 160 may evaluate each of the scores obtained by score computation unit 150. Based on the evaluation, evaluation unit 160 may determine an optimal alignment for the void pantograph highlight pattern in relation to the document formatted content.

Control processor 110 may provide printer 170 with data needed to print a document using variable data printing techniques where the document may contain a multi-layer architecture including a document formatted content, a void pantograph highlight pattern, and one-use information. The one-use information may be stored in data store 180 accessible by control processor 110 and/or printer 170.

In one implementation, imaging system 190 may be used to provide evaluation unit 160 with data on one or more digital images of the relative positions of the void pantograph highlight pattern in relation to the document formatted content. Imaging system 190 may be an image processor, an optical character recognition system, etc.

In accordance with an embodiment of the invention, a computer program application stored in non-volatile memory, or computer-readable medium (e.g., hard drive, flash memory, CD ROM, magnetic media, etc.) may include code or executable instructions that when executed may instruct or cause a controller or processor to perform methods discussed herein such as a method of producing a layered void pantograph with a specified graphical layout optimization.

While there have been shown and described fundamental novel features of the invention as applied to several embodiments, it will be understood that various omissions, substitutions, and changes in the form, detail, and operation of the illustrated embodiments may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A method for generating a document, the method comprising:
    printing a test sheet, photo-imaging the printed test sheet, and comparing the printed test sheet with the photo-imaged test sheet, the test sheet including a plurality of test pantographs, each test pantograph including a pantograph background pattern and a pantograph highlight pattern;
    selecting a test pantograph having (1) an overt printed pantograph background pattern and a covert printed pantograph highlight pattern, and (2) an overt photo-imaged pantograph background pattern and at least a semi-over photo-image pantograph highlight pattern;
    computing a score for a void pantograph highlight pattern layer including the pantograph highlight pattern of the selected test pantograph in relation to a document formatted content layer including the pantograph background pattern of the selected test pantograph;
    incrementing a relative position of the void pantograph highlight pattern layer and the document formatted content layer;
    repeating the computing and the incrementing steps to obtain a plurality of scores at a plurality of relative positions;
    evaluating the plurality of scores to determine an optimal alignment; and
    printing the document using variable-data printing techniques, wherein the printed document has a multi-layer architecture including the document formatted content layer and the void pantograph highlight pattern layer.

2. The method of claim 1, further including padding at least one of a width and a height of the document with one or more images of the void pantograph highlight pattern.

3. The method of claim 1, wherein printing includes printing one-use information in the document formatted content layer.

4. The method of claim 1, wherein the computed score for each relative position is based on at least one of a number of blackened pixels, a number of high quality overlaps, a message quality, and an assigned overall weight.

5. The method of claim 1, wherein the multi-layer architecture includes the document formatted content layer and the void pantograph highlight pattern layer at the relative position corresponding to the optimal alignment.

6. The method of claim 1, further comprising:
    generating the test sheet.

7. A non-transitory computer readable program encoded in a computer readable medium comprising:
    an executable computer program code configured to generate a document having a multi-layer architecture including a document formatted content layer and a void pantograph background pattern layer, the executable computer program code comprising:
        printing a test sheet, photo-imaging the printed test sheet, and comparing the printed test sheet with the photo-imaged test sheet, the test sheet including a plurality of test pantographs, each test pantograph including a pantograph background pattern and a pantograph highlight pattern;

selecting a test pantograph having (1) an overt printed pantograph background pattern and a covert printed pantograph highlight pattern, and (2) an overt photo-imaged pantograph background pattern and at least a semi-over photo-image pantograph highlight pattern;

computing a score for a void pantograph highlight pattern layer including the pantograph highlight pattern of the selected test pantograph in relation to a document formatted content layer including the pantograph background pattern of the selected test pantograph;

incrementing a relative position of the void pantograph highlight pattern layer and the document formatted content layer;

repeating the computing and the incrementing steps to obtain a plurality of scores at a plurality of relative positions;

evaluating the plurality of scores to determine an optimal alignment; and printing the document using variable-data printing techniques.

8. The non-transitory computer readable program of claim 7, further including padding at least one of a width and a height of the document with one or more images of the void pantograph highlight pattern layer.

9. The non-transitory computer readable program of claim 7, wherein the printing includes printing one-use information in the document formatted content layer.

10. The non-transitory computer readable program of claim 7, wherein the computed score for each relative position is based on at least one of a number of blackened pixels, a number of high quality overlaps, a message quality, and an assigned overall weight.

11. The non-transitory computer readable program of claim 10, further including comparing digital images of the document at more than one relative position to determine an optimum assigned overall weight.

12. The non-transitory computer readable program of claim 7, wherein the multi-layer architecture includes the document formatted content layer and the void pantograph highlight pattern layer at the relative position corresponding to the optimal alignment.

13. A system for generating a document, the system comprising:

a control processor connected to an internal bus;

a unit connected to the internal bus and configured to:
print a test sheet, photo-imaging the printed test sheet, and comparing the printed test sheet with the photo-imaged test sheet, the test sheet including a plurality of test pantographs, each test pantograph including a pantograph background pattern and a pantograph highlight pattern;

select a test pantograph having (1) an overt printed pantograph pattern and a covert printed pantograph highlight pattern, and (2) an overt photo-imaged pantograph background pattern and at least a semi-over photo-image pantograph highlight pattern;

a score computation unit connected to the internal bus and configured to compute a score for a relative position of a void pantograph highlight pattern including the pantograph highlight pattern of the selected test pantograph and a document formatted content including the pantograph background pattern of the selected test pantograph;

an evaluation unit configured to evaluate the score;

the control processor configured to provide a printer with data containing a multi-layer architecture document having a document formatted content and a void pantograph highlight pattern.

\* \* \* \* \*

UNITED STATES PATENT AND TRADEMARK OFFICE
CERTIFICATE OF CORRECTION

PATENT NO.       : 8,891,136 B2  
APPLICATION NO.  : 13/810687  
DATED            : November 18, 2014  
INVENTOR(S)      : Steven J. Simske et al.

Page 1 of 1

It is certified that error appears in the above-identified patent and that said Letters Patent is hereby corrected as shown below:

In The Claims

In Column 10, line 20 approx., in Claim 13, delete "pattern" and insert -- background pattern --, therefor.

Signed and Sealed this
Twenty-first Day of April, 2015

Michelle K. Lee
*Director of the United States Patent and Trademark Office*